US012803323B2

(12) United States Patent
Liu et al.

(10) Patent No.: US 12,803,323 B2
(45) Date of Patent: Nov. 17, 2026

(54) POWER CONVERTERS AND UNINTERRUPTIBLE POWER SUPPLIES (UPSS) INCLUDING THE SAME

(71) Applicant: Lian Zheng Electronics (Shenzhen) Co., Ltd., Shenzhen (CN)

(72) Inventors: Kai Liu, Shenzhen (CN); Yiping Wu, Shenzhen (CN); Zhongyong Xu, Shenzhen (CN)

(73) Assignee: Lian Zheng Electronics (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/245,530

(22) Filed: Jun. 23, 2025

(65) Prior Publication Data

US 2025/0392156 A1 Dec. 25, 2025

(30) Foreign Application Priority Data

Jun. 25, 2024 (CN) ......................... 202410834637.4

(51) Int. Cl.
*H02J 9/06* (2006.01)
*H02M 1/36* (2007.01)

(52) U.S. Cl.
CPC ............... *H02J 9/061* (2013.01); *H02M 1/36* (2013.01)

(58) Field of Classification Search
CPC ................................. H02J 9/061; H02M 1/36
See application file for complete search history.

(56) References Cited

U.S. PATENT DOCUMENTS

2005/0213357 A1 9/2005 Paatero
2007/0241616 A1 * 10/2007 Lai ........................ H02M 5/458 307/66
2023/0253877 A1 * 8/2023 Liu ..................... H02M 1/4258 363/16

FOREIGN PATENT DOCUMENTS

CN 101685975 B 2/2013

OTHER PUBLICATIONS

Extended European Search Report, EP 25183640.9, Nov. 24, 2025, 9 pages.

* cited by examiner

*Primary Examiner* — Carlos Amaya
(74) *Attorney, Agent, or Firm* — Stanek Lemon Crouse & Meeks, PA

(57) ABSTRACT

The present invention provides a power converter and an uninterruptible power supply including the same. The power converter includes: an input terminal selectively connected to a direct current power supply or an alternating current power supply; an output terminal connected to a positive direct current bus and a negative direct current bus; a power conversion unit connected between the input terminal and the output terminal and configured to selectively implement AC-DC conversion or DC-DC conversion; a soft start device unit connected between the input terminal and a positive electrode of the direct current power supply; and a soft start control unit configured to control a soft start switch to operate when the power converter is soft started, so that the direct current power supply charges the voltage of the positive direct current bus capacitor and the voltage of the negative direct current bus capacitor to the voltage of the direct current power supply through the power conversion unit, respectively. The present invention resolves the problem of device damage or circuit failure caused by an (Continued)

instantaneous high inductor current due to initial voltage imbalance between the positive direct current bus and the negative direct current bus when the power converter enters an operation status after being soft started.

18 Claims, 11 Drawing Sheets

POWER CONVERTERS AND UNINTERRUPTIBLE POWER SUPPLIES (UPSS) INCLUDING THE SAME

CROSS REFERENCE TO RELATED APPLICATION

The present application claims the benefit of and priority to Chinese Invention patent application No. 202410834637.4, titled "POWER CONVERTER AND UNINTERRUPTIBLE POWER SUPPLY INCLUDING SAME" filed on Jun. 25, 2024, the content of which is hereby incorporated herein by reference in its entirety.

TECHNICAL FIELD

The present invention belongs to the field of power electronics, and specifically relates to a power converter and an uninterruptible power supply including the same.

BACKGROUND

The statements in this part are merely intended to provide background information related to the present invention, to help understand the present invention. This background information does not necessarily constitute the conventional technology.

An uninterruptible power supply (UPS) is used to instantly switch to provide continuous power to an electrical device by a direct current power supply in an abnormal state of mains power supply (namely, a battery mode). The UPS can provide a safe, stable, and continuous power supply guarantee for the electrical device, and has been widely used and become a research hotspot. Considering factors such as current control, device protection, and system stability, a power converter supplied by a direct current power supply needs to gradually increase a bus voltage from zero to a rated voltage through soft start before a normal direct current power supply.

An existing direct current power supply soft start method can only charge half bus voltage to half voltage of the direct current power supply, and cannot effectively resolve the problem of voltage imbalance between a positive direct current bus and a negative direct current bus due to various reasons. If the normal direct current power supply starts at this time, the inductor cannot be demagnetized due to the fact that the half bus voltage is less than the voltage of the direct current power supply, resulting in a continuous increase in inductor current until switching devices are damaged.

SUMMARY

To resolve the above problems, according to a first aspect of the present invention, a power converter is provided, including: an input terminal, configured to be selectively connected to an alternating current power supply or a direct current power supply; an output terminal, configured to be connected to a positive direct current bus and a negative direct current bus, where a positive direct current bus capacitor and a negative direct current bus capacitor connected in series with each other are electrically connected between the positive direct current bus and the negative direct current bus, and a node between the positive direct current bus capacitor and the negative direct current bus capacitor is connected to a neutral line; a power conversion unit, connected between the input terminal and the output terminal, and configured to selectively implement AC-DC conversion or DC-DC conversion; a soft start device unit, connected between the input terminal and a positive electrode of the direct current power supply, where the soft start device unit includes a soft start switch and a resistor connected in series; and a soft start control unit, configured to when the power converter is soft started by the direct current power supply, control the soft start switch to operate, so that the direct current power supply charges the voltage of the positive direct current bus capacitor and the voltage of the negative direct current bus capacitor to the voltage of the direct current power supply through the power conversion unit, respectively.

Preferably, to control the soft start switch to operate, so that the direct current power supply charges the voltage of the positive direct current bus capacitor and the voltage of the negative direct current bus capacitor to the voltage of the direct current power supply through the power conversion unit, respectively, it includes: turning on the soft start switch, where the direct current power supply charges the voltage of the positive direct current bus capacitor and the voltage of the negative direct current bus capacitor to half of the voltage of the direct current power supply through the power conversion unit, respectively; and turning off the soft start switch and directly connecting the input terminal to the direct current power supply, where the direct current power supply charges the voltage of the positive direct current bus capacitor and the voltage of the negative direct current bus capacitor to the voltage of the direct current power supply through the power conversion unit, respectively.

Preferably, the power conversion unit includes: an inductor assembly, where a first terminal of the inductor assembly is connected to the input terminal; a first node connected to a second terminal of the inductor assembly; a second node connected to a negative electrode of the direct current power supply; a first branch between the first node and the positive direct current bus; a second branch between the first node and the neutral line; a third branch between the first node and the negative direct current bus; a fourth branch between the neutral line and the second node; and a fifth branch between the negative direct current bus and the second node.

Preferably, to control the soft start switch to operate, so that the direct current power supply charges the voltage of the positive direct current bus capacitor and the voltage of the negative direct current bus capacitor to the voltage of the direct current power supply through the power conversion unit, respectively, it includes: turning on the soft start switch, the first branch, and the fifth branch, to charge the voltage of the positive direct current bus capacitor and the voltage of the negative direct current bus capacitor in series to half of the voltage of the direct current power supply; turning off the fifth branch and turning on the fourth branch, to charge the voltage of the positive direct current bus capacitor to the voltage of the direct current power supply; turning off the first branch and the fourth branch, and turning on the second branch and the fifth branch, to charge the voltage of the negative direct current bus capacitor to the voltage of the direct current power supply; and turning off the second branch, the fifth branch, and the soft start switch, and directly connecting the input terminal to the direct current power supply, to complete the soft start.

Preferably, the soft start control unit is further configured to, after directly connecting the input terminal to the direct current power supply: turn on the third branch and the fifth branch, so that the direct current power supply stores energy in the inductor assembly; turn off the third branch and turn on the first branch, so that the inductor assembly charges the positive direct current bus capacitor and the negative direct current bus capacitor in series; and repeat the above steps until the voltage of the positive direct current bus capacitor and the voltage of the negative direct current bus capacitor rise to a set voltage; where the set voltage is higher than the voltage of the direct current power supply.

Preferably, to turn off the third branch and turn on the first branch, so that the inductor assembly charges the positive direct current bus capacitor and the negative direct current bus capacitor in series, it further includes: when the voltage of the negative direct current bus capacitor is higher than a set voltage threshold of the positive direct current bus capacitor, turning on the fourth branch, so that the inductor assembly boosts the positive direct current bus capacitor separately; and when the voltage of the positive direct current bus capacitor is higher than a set voltage threshold of the negative direct current bus capacitor, turning on the second branch, so that the inductor assembly boosts the negative direct current bus capacitor separately.

Preferably, the first branch is controlled by a first diode to turn on unidirectionally from the first node to the positive direct current bus, a positive electrode of the first diode is connected to the first node, and a negative electrode of the first diode is connected to the positive direct current bus; and/or the second branch is controlled to turn on by a first transistor and a second transistor connected in reverse series with the first transistor, the other terminal of the first transistor is connected to the first node, and the other terminal of the second transistor is connected to the neutral line; and/or the third branch is controlled to turn on by a third transistor, a first terminal of the third transistor is connected to the first node, and a second terminal of the third transistor is connected to the negative direct current bus.

Preferably, the fourth branch is controlled to turn on by a fourth transistor, a first terminal of the fourth transistor is connected to the neutral line, and a second terminal of the fourth transistor is connected to the second node.

Preferably, the fifth branch is controlled by a second diode to turn on unidirectionally from the negative direct current bus to the negative electrode of the direct current power supply, a positive electrode of the second diode is connected to the negative direct current bus, and a negative electrode of the second diode is connected to the second node.

According to a second aspect of the present invention, an uninterruptible power supply is provided, including the power converter as in the first aspect.

In embodiments of the present invention, the single-sided bus is charged to the voltage of the direct current power supply separately, solving the problem of device damage or circuit failure caused by an instantaneous high inductor current when the power converter enters a normal operation status after being soft started due to initial voltage imbalance between the positive direct current bus and the negative direct current bus.

DETAILED DESCRIPTION

Specific embodiments of the present invention will be described in detail below. It should be noted that these embodiments are only for illustrative purposes and are not intended to limit the present invention. In the following description, a large number of specific details are elaborated to provide a thorough understanding of the present invention. However, it is obvious to those skilled in the art that the present invention is not necessarily implemented by these specific details. In other examples, to avoid confusion with the present invention, well-known programs, materials, or methods are not specifically described.

A UPS uses soft start when powered by a direct current power supply, mainly to control starting current, protect a device, and improve the stability of a system. When the UPS switches to be powered by the direct current power supply BT, if the instantaneous current is too high, not only may the UPS be damaged, but also impact may be caused on the electrical device, resulting in damage or performance degradation of the electrical device. The electrical device connected to the UPS may be affected. Through the soft start, the power supply can smoothly transition to direct current power supply state, and the starting current changes from overload surge current to be controllable, thereby protecting the device from current surge. Hard start may cause fluctuations in system voltage or current, affecting the stability of the entire system. The soft start can reduce such fluctuations, making the system run more stably. The soft start is of great significance for ensuring the normal operation of the UPS and the electrical device, as well as the stable power supply of the entire power system.

Figure 1:
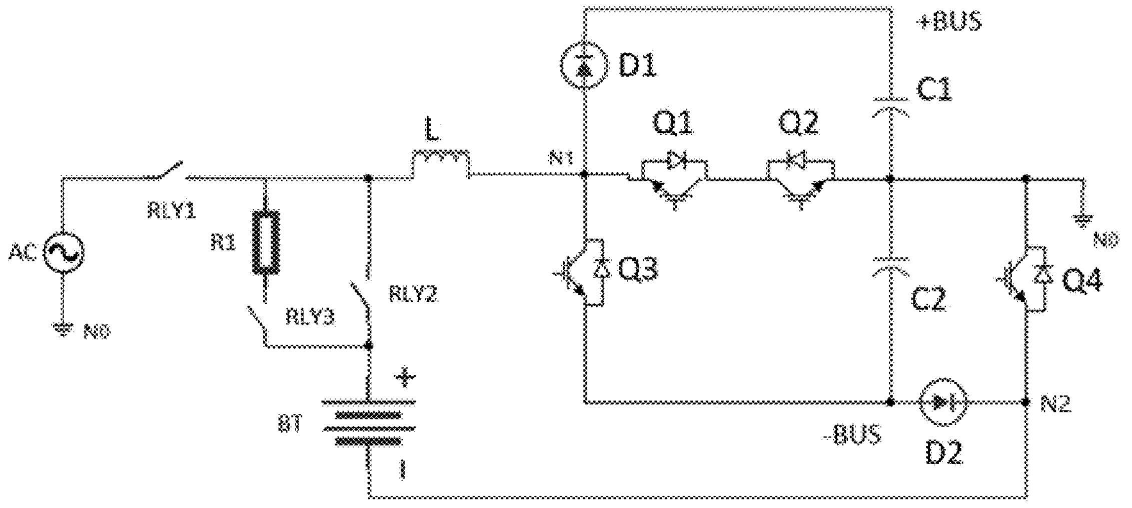
FIG. 1 is a schematic diagram of a circuit structure of a power converter according to an embodiment of the present invention.

One embodiment of the present invention can be implemented based on a power converter shown in FIG. 1. As shown in FIG. 1, the power converter includes an input terminal, an output terminal, and a power conversion unit. The input terminal is connected to an alternating current power supply AC by closing a first mechanical switch RLY1 or to a direct current power supply BT by closing a second mechanical switch RLY2. The output terminal is connected to a positive direct current bus +BUS and a negative direct current bus −BUS, and a positive direct current bus capacitor C1 and a negative direct current bus capacitor C2 connected in series with each other are electrically connected between the positive direct current bus +BUS and the negative direct current bus −BUS. A node between the positive direct current bus capacitor C1 and the negative direct current bus capacitor C2 is connected to a neutral line NO. The power conversion unit is connected between the input terminal and the output terminal and configured to selectively implement AC-DC conversion or DC-DC conversion. The power conversion unit includes an inductor assembly L, a first node N1, a second node N2, a first branch, a second branch, a third branch, a fourth branch, and a fifth branch. A first terminal of the inductor assembly L is connected to the input terminal, and a second terminal of the inductor assembly L is connected to the first node. The second node N2 is connected to a negative electrode of a direct current power supply. The first branch includes a first diode D1 for controlling the conduction between the first node N1 and the positive direct current bus +BUS. A positive electrode (or anode) of the first diode D1 is connected to the first node N1, and a negative electrode (or cathode) of the first diode D1 is connected to the positive direct current bus +BUS. The second branch includes a first transistor Q1 and a second transistor Q2 connected in reverse series with the first transistor. The first transistor Q1 and the second transistor Q2 are used to control the unidirectional conduction between the first node N1 and the neutral line NO. A first terminal of the first transistor Q1 is connected to a first terminal of the second transistor Q2, a second terminal of the first transistor Q1 is connected to the first node N1, and a second terminal of the second transistor Q2 is connected to the neutral line NO. The third branch includes a third transistor Q3 for controlling the conduction between the first node N1 and the negative direct current bus −BUS. A first terminal of the third transistor Q3 is connected to the first node N1, and a second terminal of the third transistor Q3 is connected to the negative direct current bus −BUS. The fourth branch includes a fourth transistor Q4, and the fourth transistor Q4 is used to control the conduction of the fourth branch between the neutral line NO and the second node N2. A first terminal of the fourth transistor Q4 is connected to the neutral line NO, and a second terminal thereof is connected to the second node N2. The fifth branch includes a second diode D2, and the second diode D2 is used to control the conduction of the fifth branch between the negative direct current bus and the second node N2. A positive electrode of the second diode D2 is connected to the negative direct current bus −BUS, and a negative electrode thereof is connected to the second node N2.

As shown in FIG. 1, the power converter further includes a soft start device unit. The soft start device unit includes a soft start switch RLY3 and a resistor R1 connected in series between a positive electrode of the direct current power supply BT and the other terminal of the inductor assembly L. In the prior art, a soft start method for direct current power supply to the power converter based on the soft start device unit includes: at the beginning of soft start, the first transistor Q1, the second transistor Q2, the third transistor Q3, the fourth transistor Q4, the first mechanical switch RLY1, and the second mechanical switch RLY2 are all in an OFF state. The soft start switch RLY3 is turned on, and current of the direct current power supply BT passes through the resistor R1→the inductor assembly L→the first diode D1→the positive direct current bus capacitor C1→the negative direct current bus capacitor C2→the second diode D2 →a negative electrode of the direct current power supply BT in sequence. Therefore, the direct current power supply BT pre-charges the positive direct current bus capacitor C1 and the negative direct current bus capacitor C2. However, in this case, voltages of the positive direct current bus capacitor C1 and the negative direct current bus capacitor C2 can only be pre-charged to half of the voltage of the direct current power supply BT, respectively. Subsequently, the soft start switch RLY3 is turned off and the second mechanical switch RLY2 is turned on to control the third transistor Q3 by pulse width modulation. The use of the inductor assembly L to charge and boost the positive direct current bus capacitor C1 and the negative direct current bus capacitor C2 includes: when the third transistor Q3 is turned on, the direction of current is the positive electrode of the direct current power supply BT→the inductor assembly L→the third transistor Q3→the second diode D2→the negative electrode of the direct current power supply BT, so that the direct current power supply BT charges the inductor assembly L. When the third transistor Q3 is turned off, the direction of current is the positive electrode of the direct current power supply BT→the inductor assembly L→the first diode D1→the positive direct current bus capacitor C1→the negative direct current bus capacitor C2→the second diode D2→the negative electrode of the direct current power supply BT, so that the inductor assembly L charges the positive direct current bus capacitor C1 and the negative direct current bus capacitor C2. The third transistor Q3 is controlled by pulse width modulation to charge the positive direct current bus capacitor C1 and the negative direct current bus capacitor C2 to be higher than the voltage of the direct current power supply BT, and the converter enters a normal operation status in a battery mode.

Figure 2:
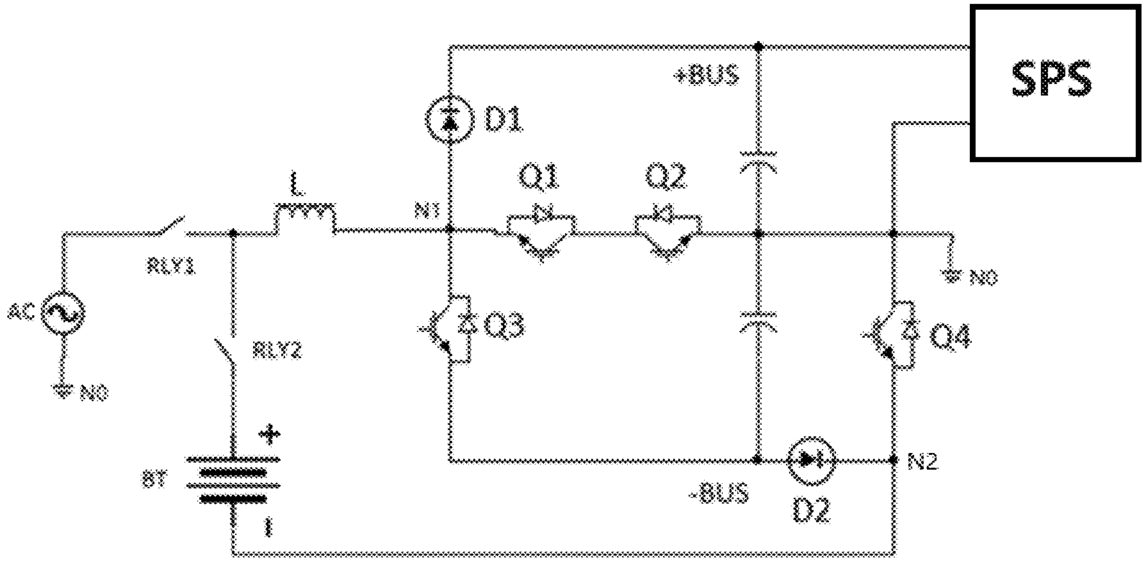
FIG. 2 is a schematic diagram of a circuit structure of an SPS connected to a single-sided bus of the circuit shown in FIG. 1.

However, in practical scenarios, the power converter may encounter initial voltage imbalance between the positive direct current bus and the negative direct current bus before soft start. This imbalance may be caused by various factors, such as:

- due to the asymmetry of positive and negative waveforms in a mains mode, half of the input waveform is overvoltage;
- in the battery mode after a bus overvoltage protection shutdown, initial voltages of the positive direct current bus and the negative direct current bus are unbalanced;
- when a plurality of UPSs connected in parallel have asynchronous output or a load end is connected to an inverter and a charger, the output may flow back to the direct current bus, resulting in initial voltage imbalance between the positive direct current bus and the negative direct current bus in the battery mode after a overvoltage protection shutdown;
- because a storage power supply (SPS) is supplied power by a single bus, initial voltage imbalance between the positive direct current bus and the negative direct current bus occurs when the UPS ends the mains mode (as shown in FIG. 2).

Figure 3:
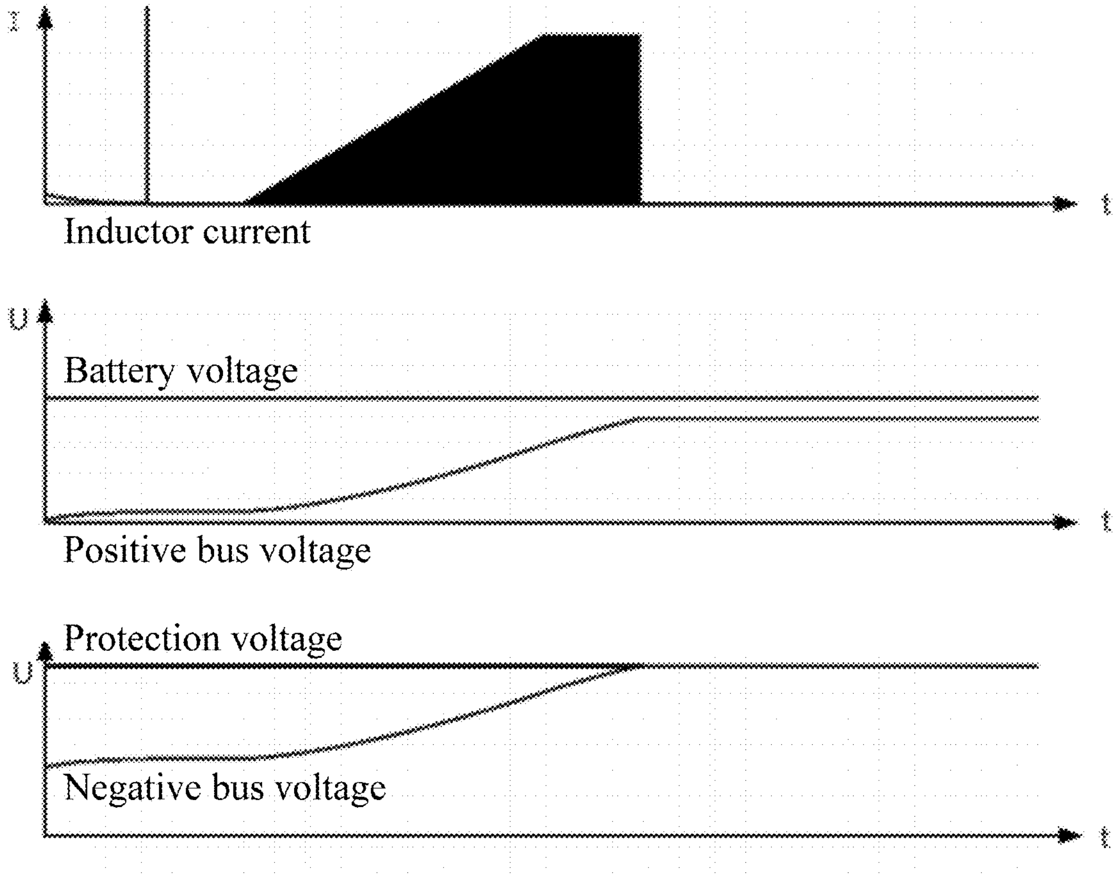
FIG. 3 is a simulation waveform diagram of soft start for a power converter with no residual voltage on a positive direct current bus and residual voltage on a negative direct current bus in the prior art.
Figure 4:
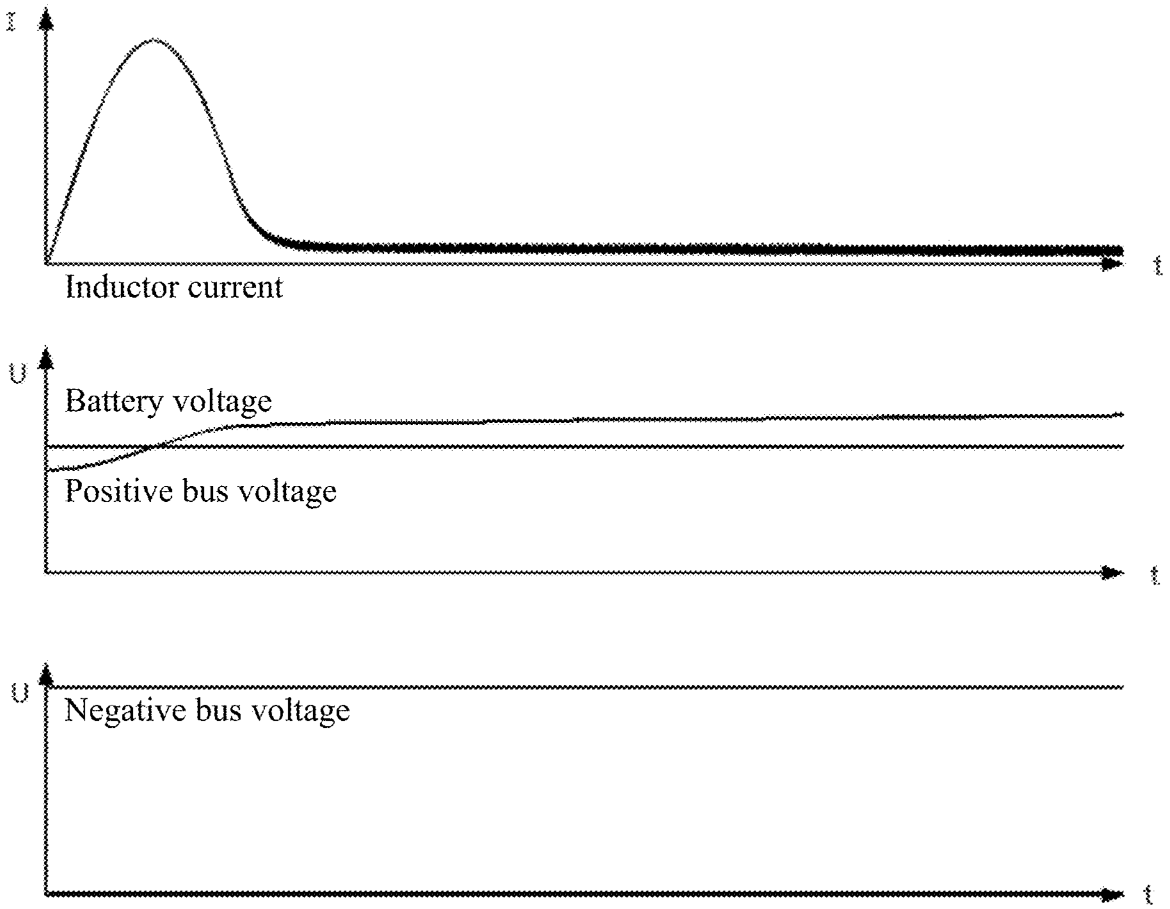
FIG. 4 is a simulation waveform diagram after the power converter starts a normal operation status based on simulation results of FIG. 3.

In these cases, if series circuits of the positive direct current bus and the negative direct current bus are simultaneously charged for soft start only by pre-charging the resistor and controlling the third transistor Q3 by pulse width modulation, the imbalance between the buses is likely to cause soft start failure or damage to circuit devices. For example, at the beginning of soft start, the initial voltage of the positive direct current bus is 0 V, while the residual voltage of the negative direct current bus is 200 V. If the series circuits of the positive direct current bus and the negative direct current bus are simultaneously charged for soft start by pre-charging the resistor and controlling the third transistor Q3 by pulse width modulation, simulation waveforms of this process are shown in FIG. 3. As can be seen in FIG. 3 (in FIG. 3, the horizontal axis represents time t, and the vertical axis represents current I or voltage U), when the voltage of the negative direct current bus has reached preset protection voltage, the third transistor Q3 stops pulse width modulation. At this time, the voltage of the positive direct current bus has not reached the voltage of the direct current power supply (namely, battery voltage in FIG. 3), and it should be determined as soft start failure. If the situation where the positive direct current bus has not reached the voltage of the direct current power supply is ignored and a normal operation status of the circuit is directly performed, simulation shown in FIG. 4 occurs. In FIG. 4, when the normal operation status of the circuit starts, the initial voltage of the positive direct current bus is lower than the voltage of the direct current power supply (namely, battery voltage in FIG. 4). If the pulse width modulation in the normal operation status of the circuit starts at this time because the voltage of the positive direct current bus is lower than the voltage of the direct current power supply, the inductor cannot be demagnetized regardless of whether the switching device by pulse width modulation is turned on or off, and inductor current will instantly surge, which may damage switching devices in the circuit or cause circuit fusing. Based on the above analysis, the inventor found, during soft start, it is necessary to ensure that the voltages of both the positive direct current bus and the negative direct current bus are close to or more than the voltage of the direct current power supply (namely, within a range of 5% above and below the voltage of the direct current power supply), so as to avoid device damage or circuit failure caused by an instantaneous high inductor current during normal operation.

Figure 5:
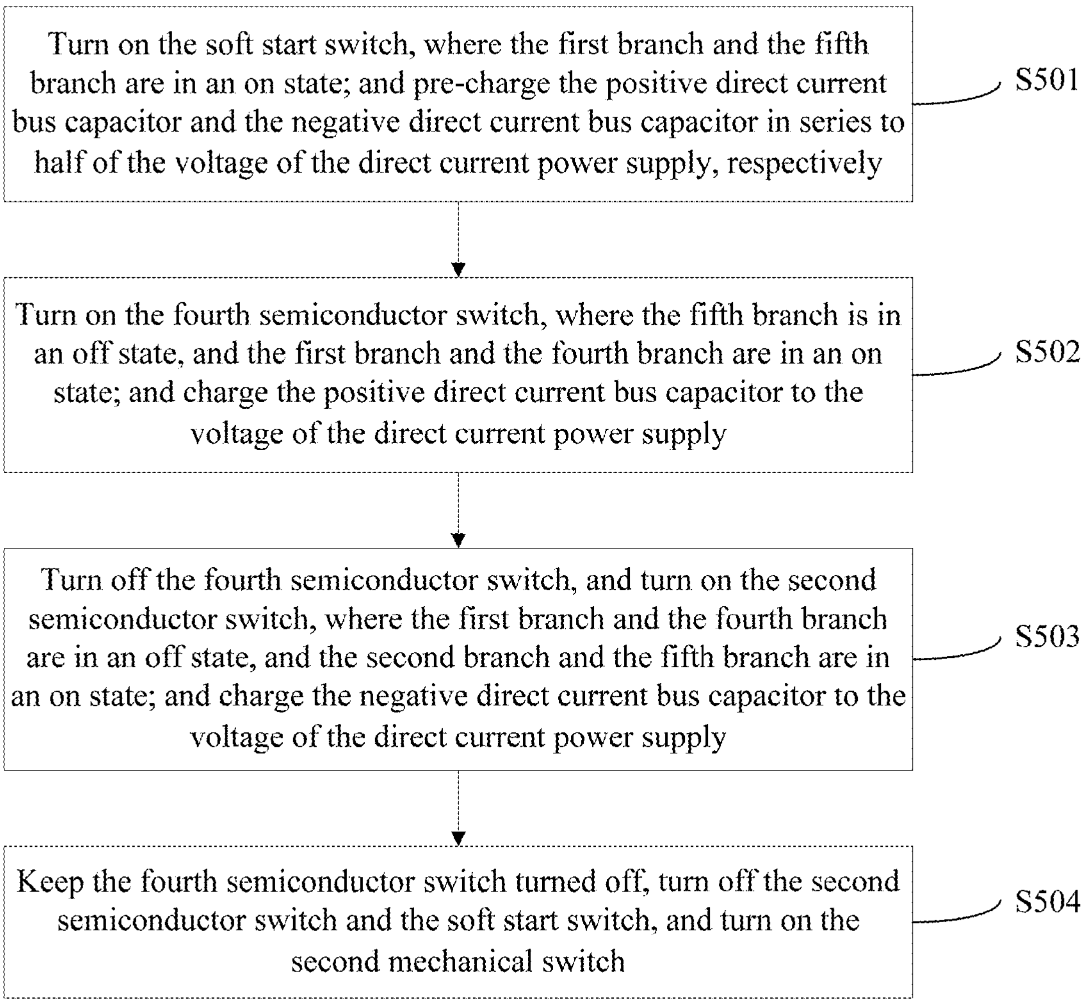
FIG. 5 is a schematic flowchart of soft start for a power converter according to an embodiment of the present invention.
Figure 6A:
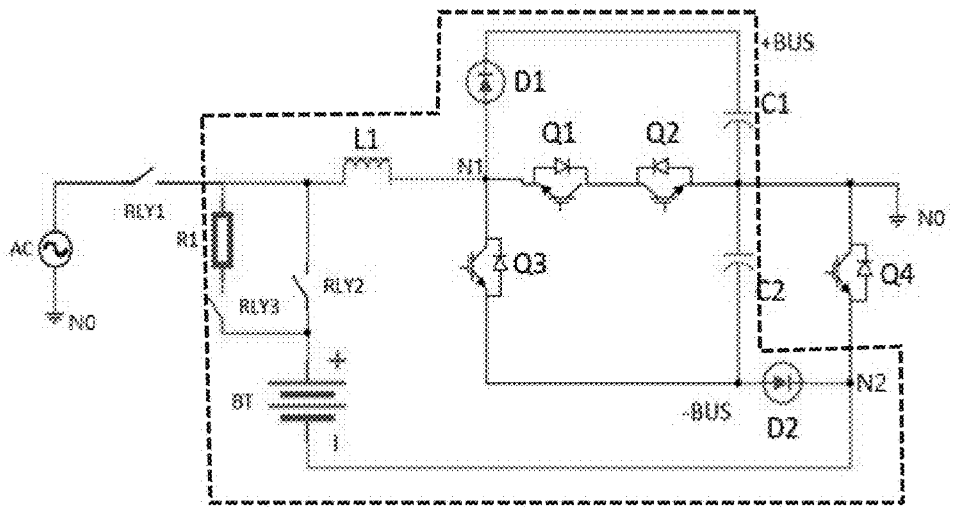
FIG. 6*a* is a schematic diagram of a current flow direction in which a positive direct current bus capacitor and a negative direct current bus capacitor are pre-charged in series in a second stage of a direct current power supply soft start method according to an embodiment of the present invention.
Figure 6B:
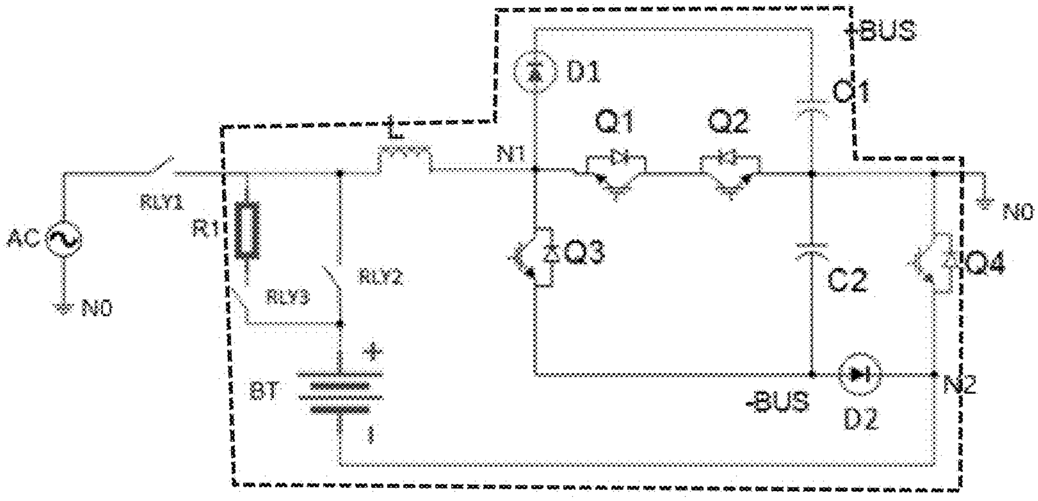
FIG. 6*b* is a schematic diagram of a current flow direction in which a direct current power supply pre-charges the positive direct current bus capacitor in the second stage of the direct current power supply soft start method according to an embodiment of the present invention.
Figure 6C:
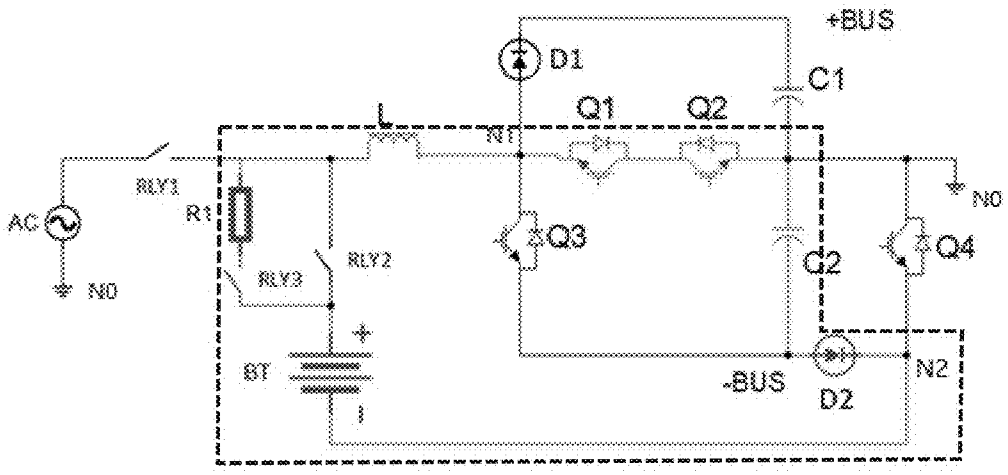
FIG. 6*c* is a schematic diagram of a current flow direction in which the direct current power supply pre-charges the negative direct current bus capacitor in the second stage of the direct current power supply soft start method according to an embodiment of the present invention.

According to one embodiment of the present invention, a power converter is provided based on FIG. 1. In addition to the devices shown in FIG. 1, the power converter further includes a soft start control unit. The soft start control unit is configured to execute a soft start process as shown in FIG. 5. At the beginning of soft start, the first transistor Q1, the second transistor Q2, the third transistor Q3, the fourth transistor Q4, the first mechanical switch RLY1, and the second mechanical switch RLY2 are all in an OFF state. Step S501: Turn on the soft start switch RLY3. As shown in FIG. 6*a*, the current of the direct current power supply BT passes through the resistor R1→the inductor assembly L→the first diode D1→the positive direct current bus capacitor C1→the negative direct current bus capacitor C2→the second diode D2→the negative electrode of the direct current power supply BT. At this time, the first branch and the fifth branch are in an ON state, to pre-charge the positive direct current bus capacitor C1 and the negative direct current bus capacitor C2 in series until the voltages of the positive direct current bus capacitor C1 and the negative direct current bus capacitor C2 are half of the voltage of the direct current power supply BT, respectively. Step S502: Turn on the fourth transistor Q4. As shown in FIG. 6*b*, the current of the direct current power supply BT passes through the resistor R1→the inductor assembly L→the first diode D1→the positive direct current bus capacitor C1→the fourth transistor Q4→the negative electrode of the direct current power supply BT. At this time, the fifth branch is in an OFF state, the first branch and the fourth branch are in an ON state, and the direct current power supply BT pre-charges the positive direct current bus capacitor C1 to the voltage of the direct current power supply BT. Step S503: Turn off the fourth transistor Q4 and turn on the second transistor Q2. As shown in FIG. 6*c*, the current of the direct current power supply BT passes through the resistor R1→the inductor assembly L→the first transistor Q1→the second transistor Q2→the negative direct current bus capacitor C2→the second diode D2 →the negative electrode of the direct current power supply BT. At this time, the first branch and the fourth branch are in an OFF state, the second branch and the fifth branch are in an ON state, and the direct current power supply BT pre-charges the negative direct current bus capacitor C2 to the voltage of the direct current power supply BT. It should be noted that the direct current power supply BT does not sequentially pre-charge the positive direct current bus capacitor C1 and the negative direct current bus capacitor C2 to the voltage of the direct current power supply BT (that is, steps S202 and S203 are not sequential). Step S504: Keep the fourth transistor Q4 turned off, turn off the second transistor Q2 and the soft start switch RLY3, and turn on the second mechanical switch RLY2 (namely, directly connect the input terminal to the direct current power supply), to complete the soft start for the direct current power supply. The power converter enters a normal operation status in a battery mode. In the embodiments of the present invention, after the positive direct current bus and the negative direct current bus connected in series are boosted in the first phrase, the positive direct current bus and the negative direct current bus are respectively boosted in the second phrase to the voltage of the direct current power supply, solving the problem of device damage or circuit failure caused by the instantaneous high inductor current when the power converter enters the operation status due to the fact that the positive direct current bus and the negative direct current bus do not reach the voltage of the direct current power supply after the soft start in case of initial voltage imbalance.

In some embodiments, keeping the fourth transistor Q4 turned off, turning off the second transistor Q2 and the soft start switch RLY3, and turning on the second mechanical switch RLY2, the process may further include: controlling the third transistor Q3 by pulse width modulation, and charging the positive direct current bus capacitor C1 and the negative direct current bus capacitor C2 to a set voltage through the inductor assembly L. In some embodiments, the set voltage may be the voltage of the direct current power supply BT or higher than the voltage of the direct current power supply BT. These embodiments can ensure that the voltages of both the positive direct current bus and the negative direct current bus can reach or even exceed the voltage of the direct current power supply BT, which can better avoid the problem of instantaneous high inductor current.

Figure 7A:
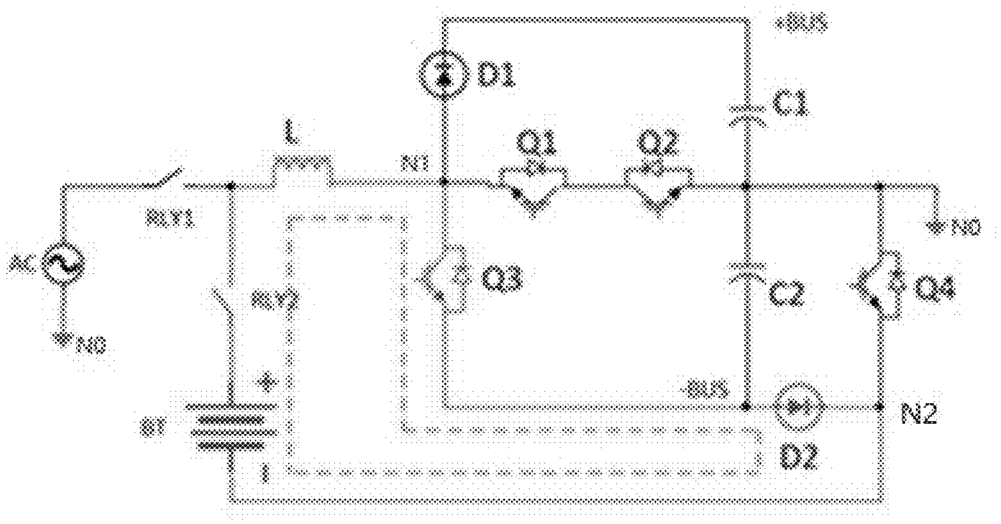
FIG. 7*a* is a schematic diagram of a current flow direction in which the direct current power supply stores energy in an inductor in a third stage of the direct current power supply soft start method according to an embodiment of the present invention.
Figure 7B:
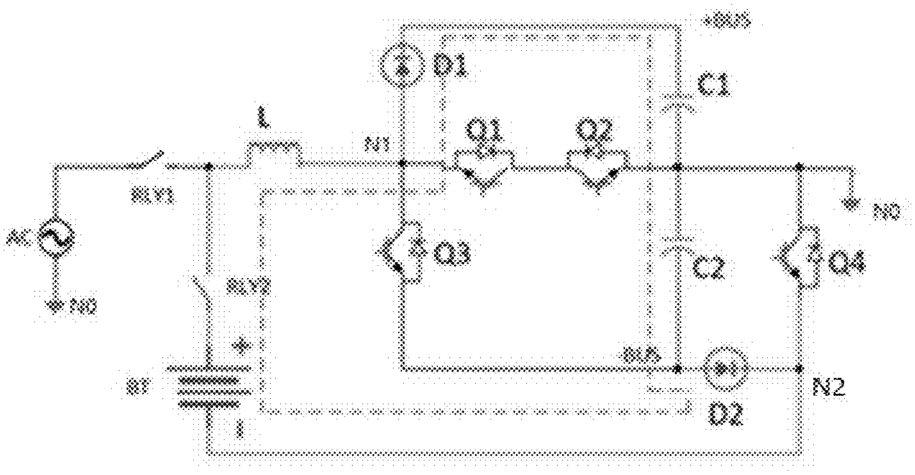
FIG. 7*b* is a schematic diagram of a current flow direction in which the inductor charges the positive direct current bus capacitor and the negative direct current bus capacitor in series in the third stage of the direct current power supply soft start method according to an embodiment of the present invention.

In some embodiments, controlling the third transistor Q3 by pulse width modulation, and charging the positive direct current bus capacitor C1 and the negative direct current bus capacitor C2 to a set voltage through the inductor assembly L includes: when the third transistor Q3 is turned on, as shown in FIG. 7*a*, the direction of current is the positive electrode of the direct current power supply BT→the inductor assembly L→the third transistor Q3→the second diode D2→the negative electrode of the direct current power supply BT. At this time, the third branch is controlled to turn on, the fifth branch is turned on unidirectionally, and the direct current power supply BT stores energy in the inductor L. When the third transistor Q3 is turned off, as shown in FIG. 7*b*, the direction of current is the positive electrode of the direct current power supply BT→the inductor assembly L→the first diode D1→the positive direct current bus capacitor C1→the negative direct current bus capacitor C2→the second diode D2→the negative electrode of the direct current power supply BT. At this time, because the third branch is controlled to turn off and the second branch is also turned off, the first branch is turned on unidirectionally, the fifth branch remains turned on unidirectionally, and the inductor L charges the positive direct current bus capacitor C1 and the negative direct current bus capacitor C2 in series until the voltages of the positive direct current bus capacitor C1 and the negative direct current bus capacitor C2 reach the set voltage.

Figure 8:
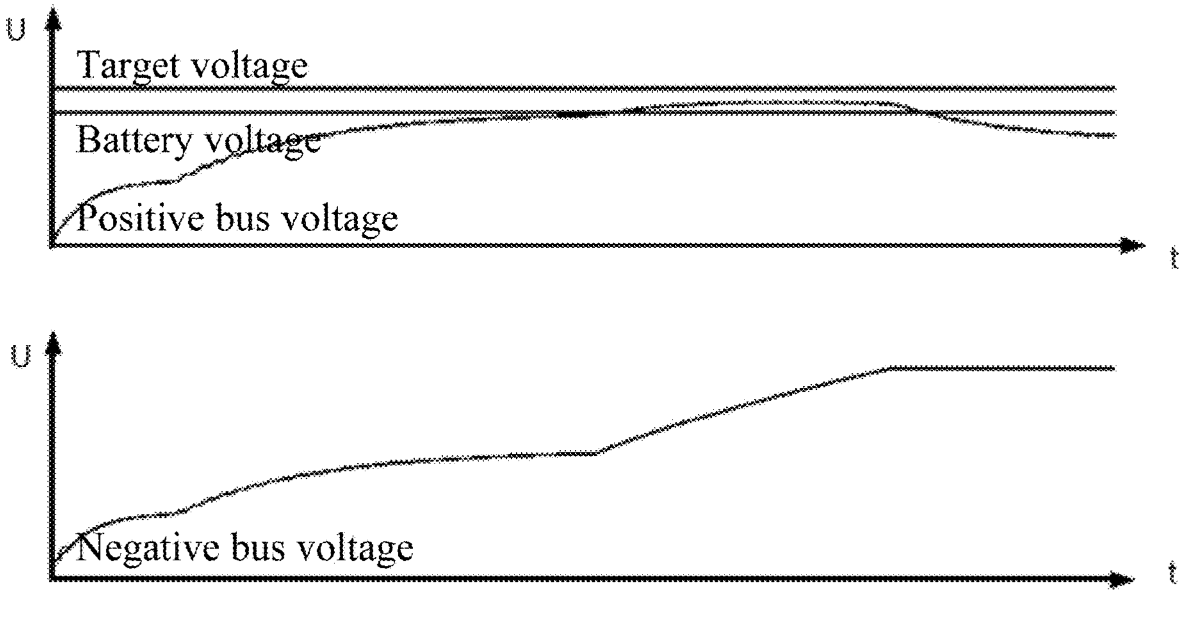
FIG. 8 is a simulation waveform diagram of soft start based on power consumption imbalance between the positive direct current bus and the negative direct current bus in FIG. 3.

In practical applications, power consumption imbalance between the positive direct current bus and the negative direct current bus may occur. For example, the circuit shown in FIG. 2 may supply power to an SPS by the single-sided positive direct current bus. To avoid excessive impact on the input capacitor of the SPS, power needs to be immediately supplied by the positive direct current bus at the end of the resistor pre-charging process of soft start. Therefore, at the end of the resistor pre-charging process, power consumptions of the positive direct current bus and the negative direct current bus are unbalanced. Although the pulse width of the circuit can be modulated in the normal operation status as long as the positive direct current bus or the negative direct current bus reaches the voltage of the direct current power supply at the end of soft start, the target voltage (namely, the set voltage) for soft start is usually set to a certain value higher than the voltage of the direct current power supply when the UPS is designed. The power consumption of the positive direct current bus caused by SPS connection to the positive direct current bus is greater than that of the negative direct current bus, making the voltage of the positive direct current bus fail to reach the target voltage for soft start, and resulting in soft start failure. Simulation waveforms shown in FIG. 8 (in FIG. 8, the horizontal axis represents time t and the vertical axis represents voltage U) show that the positive direct current bus is connected to a 70 W load (SPS) exclusively. According to the above embodiments, after the resistor pre-charging is completed, because the SPS is connected to the positive direct current bus, the voltages of the positive direct current bus and the negative direct current bus rise slowly during the pulse width modulation by the third transistor Q3. After the negative direct current bus reaches the protection voltage, the third transistor Q3 stops the pulse width modulation. At this time, the voltage of the positive direct current bus exceeds the voltage of the direct current power supply (namely, battery voltage in FIG. 8), but has not reached the set soft start target voltage. Instead, due to the power consumption of the SPS, as the third transistor Q3 stops the pulse width modulation and the voltage of the positive direct current bus gradually drops to be lower than the voltage of the direct current power supply, the soft start fails accordingly. Therefore, the inventors found, during the process of pulse width modulation by the third transistor Q3 to increase the voltage of the positive direct current bus capacitor C1 and the negative direct current bus capacitor C2, timely adjustment on the voltages of the positive direct current bus and the negative direct current bus is very important in applications where the power consumptions of the positive direct current bus and the negative direct current bus are unbalanced.

In some embodiments, the third transistor Q3 is controlled by pulse width modulation, the positive direct current bus capacitor C1 and the negative direct current bus capacitor C2 are charged to be higher than the set voltage through the inductor assembly L, and when the imbalance between the positive direct current bus and the negative direct current bus reaches a set level, the voltages of the positive direct current bus and the negative direct current bus can be adjusted for balance so that both of the voltages of the positive direct current bus and the negative direct current bus are boosted to reach the set voltage.

Figure 9A:
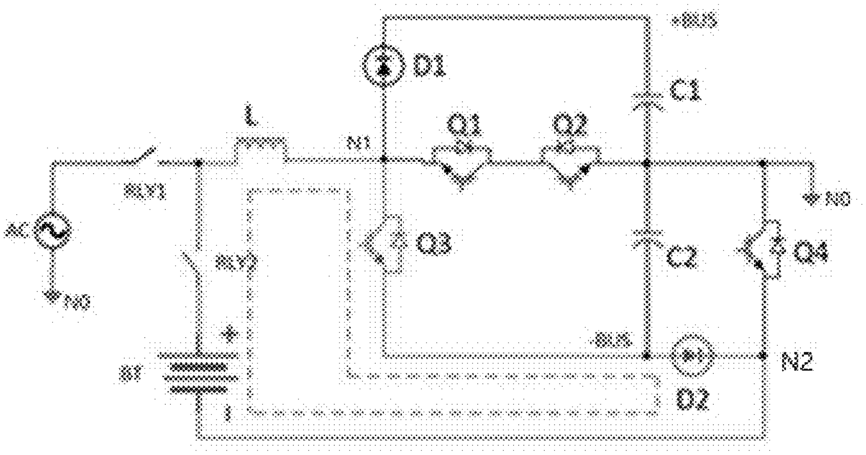
FIG. 9*a* is a schematic diagram of a current flow direction in which the direct current power supply stores energy in an inductor assembly when the voltage of the negative direct current bus is higher than that of the positive direct current bus in the third stage of the direct current power supply soft start method according to an embodiment of the present invention.

Specifically, when the voltage of the negative direct current bus capacitor C2 is higher than that of the positive direct current bus capacitor C1, the fourth transistor Q4 is turned on (that is, the fourth branch is controlled to turn on), and combined with the pulse width modulation by the third transistor Q3, the positive direct current bus capacitor C1 is charged separately. When the third transistor Q3 is turned on, as shown in FIG. 9*a*, the current of the direct current power supply BT passes through the positive electrode of the direct current power supply BT→the inductor assembly L→the third transistor Q3→the second diode D2→the negative electrode of the direct current power supply BT. At this time, the third branch is controlled to turn on, the fifth branch is turned on unidirectionally, and the direct current power supply BT stores energy in the inductor assembly L.

Figure 9B:
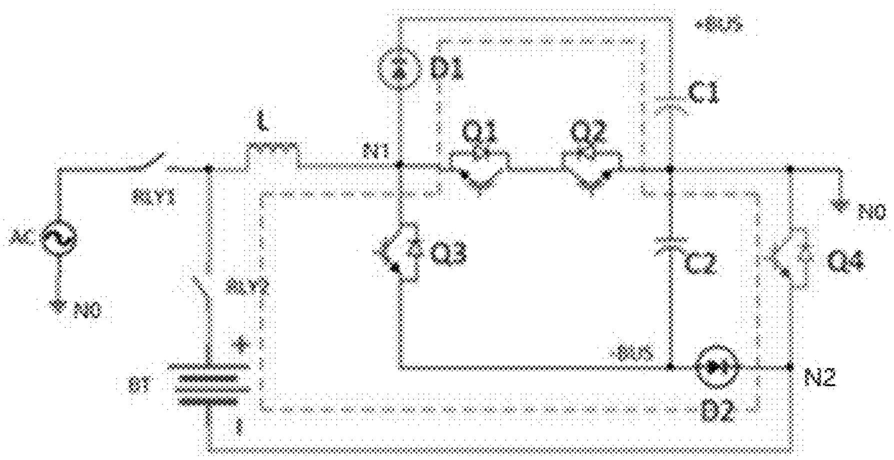
FIG. 9*b* is a schematic diagram of a current flow direction in which the inductor assembly charges the positive direct current bus capacitor when the voltage of the negative direct current bus is higher than that of the positive direct current bus in the third stage of the direct current power supply soft start method according to an embodiment of the present invention.

When the third transistor Q3 is turned off, as shown in FIG. 9*b*, the current of the direct current power supply BT passes through the positive electrode of the direct current power supply BT→the inductor assembly L→the first diode D1→the positive direct current bus capacitor C1→the fourth transistor Q4→the negative electrode of the direct current power supply BT. At this time, because the third branch is controlled to turn off and the second branch is turned off, the first branch is turned on unidirectionally. Because the fourth branch is controlled to turn on, the current does not pass through the fifth branch, and the inductor assembly L charges the positive direct current bus capacitor C1.

Figure 10A:
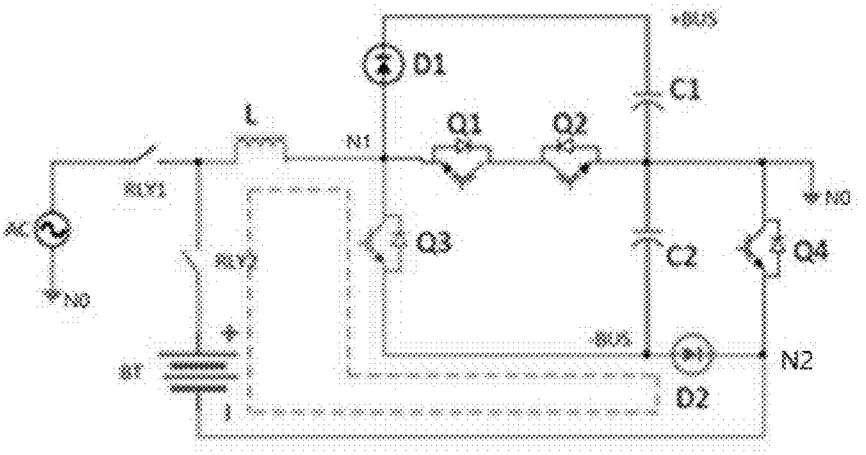
FIG. 10*a* is a schematic diagram of a current flow direction in which the direct current power supply stores energy in the inductor assembly when the voltage of the positive direct current bus is higher than that of the negative direct current bus in the third stage of the direct current power supply soft start method according to an embodiment of the present invention.
Figure 10B:
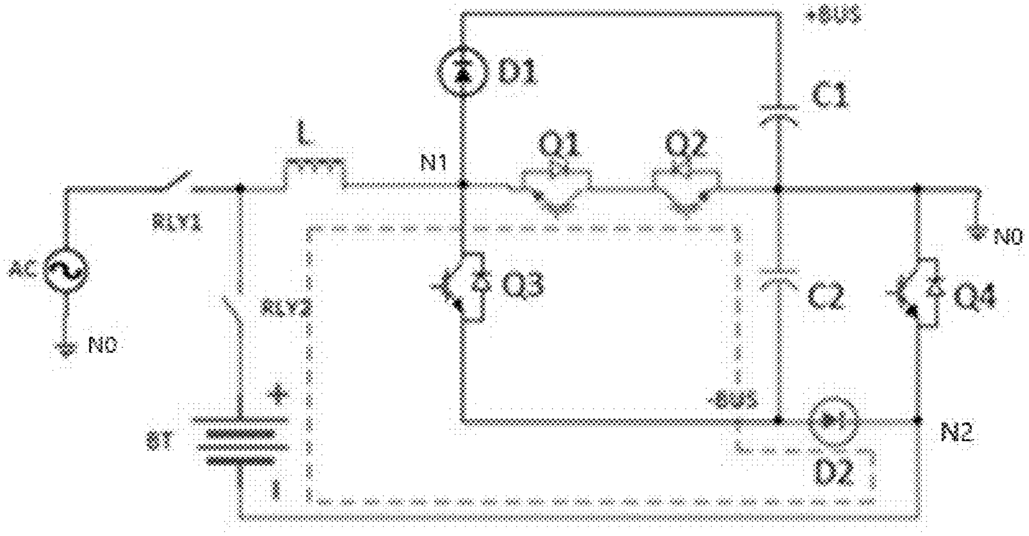
FIG. 10*b* is a schematic diagram of a current flow direction in which the inductor assembly charges the negative direct current bus capacitor when the voltage of the positive direct current bus is higher than that of the negative direct current bus in the third stage of the direct current power supply soft start method according to an embodiment of the present invention.

When the voltage of the positive direct current bus capacitor C1 is higher than that of the negative direct current bus capacitor C2, the second transistor Q2 is turned on, and combined with the pulse width modulation by the third transistor Q3, the negative direct current bus capacitor C2 is charged separately. When the third transistor Q3 is turned on, as shown in FIG. 10*a*, the current of the direct current power supply BT passes through the positive electrode of the direct current power supply BT→the inductor assembly L→the third transistor Q3→the second diode D2→the negative electrode of the direct current power supply BT. At this time, the third branch is controlled to turn on, the fifth branch is turned on unidirectionally, and the direct current power supply BT stores energy in the inductor assembly L. When the third transistor Q3 is turned off, as shown in FIG. 10*b*, the current of the direct current power supply BT passes through the positive electrode of the direct current power supply BT→the inductor assembly L→the first transistor Q1→the second transistor Q2→the negative direct current bus capacitor C2→the second diode D2→the negative electrode of the direct current power supply BT. At this time, the third branch is controlled to turn off, the current does not pass through the first branch because the second branch is turned on, the fifth branch remains on unidirectionally, and the inductor assembly L charges the negative direct current bus capacitor C2.

In response to the problem of voltage imbalance caused by different power consumptions of the positive direct current bus and the negative direct current bus, the single-sided bus is additionally adjusted and charged based on the balance between the voltages of the positive direct current bus and the negative direct current bus during the second-phrase boosting process of the entire bus in the embodiments of the present invention. The soft start method in the embodiments of the present invention can enable the voltages of the positive direct current bus and the negative direct current bus to be charged to reach the soft start target voltage during the soft start process in case of different power consumptions, achieving successful soft start of the power converter.

Figure 11:
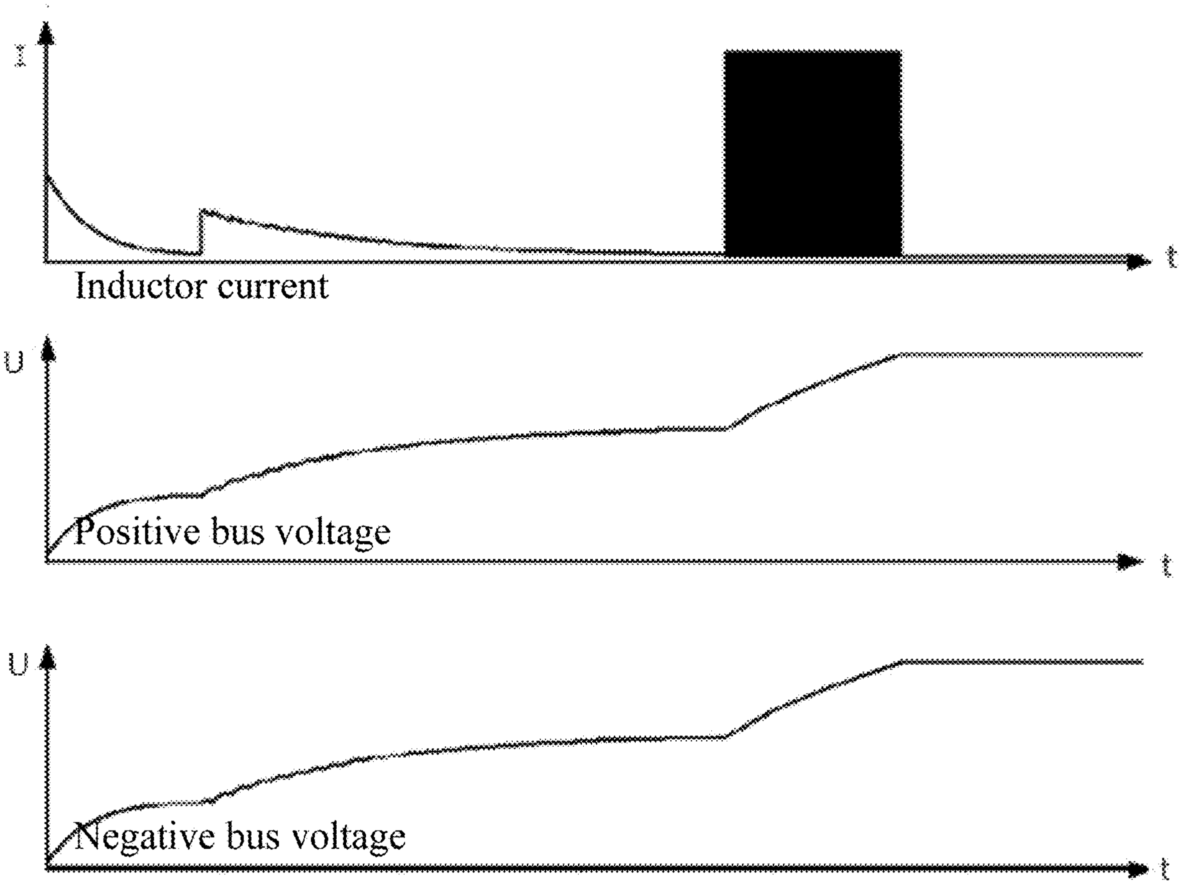
FIG. 11 is a waveform diagram of soft start simulation for a converter with an SPS connected to a single-side bus according to an embodiment of the present invention.

FIG. 11 shows soft start simulation waveforms of an SPS connected to a single bus in an embodiment of the present invention (the horizontal axis represents time t, and the vertical axis represents current I or voltage U). First, the positive direct current bus capacitor C1 and the negative direct current bus capacitor C2 are charged in series to half of the voltage of the direct current power supply BT. Then, the fourth transistor Q4 is turned on to charge the positive direct current bus capacitor C1 to the voltage of the direct current power supply BT, the fourth transistor Q4 is turned off and the second transistor Q2 is turned on to charge the negative direct current bus capacitor C2 to the voltage of the direct current power supply BT. After the soft start switch RLY3 is turned off and the second mechanical switch RLY2 is turned on, the third transistor Q3 can further be controlled by pulse width modulation, and the inductor assembly L charges the positive direct current bus capacitor C1 and the negative direct current bus capacitor C2 to be higher than the voltage of the direct current power supply BT and reach the set soft start target voltage. During the process of controlling the transistor Q3 by pulse width modulation and boosting, the fourth transistor Q4 or the second transistor Q2 is turned on according to the level of imbalance between the positive direct current bus and the negative direct current bus until the positive direct current bus capacitor C1 and the negative direct current bus capacitor C2 are charged to the soft start target voltage, so as to resolve the problem of voltage imbalance caused by different power consumptions of the positive direct current bus and the negative direct current bus.

Figure 12:
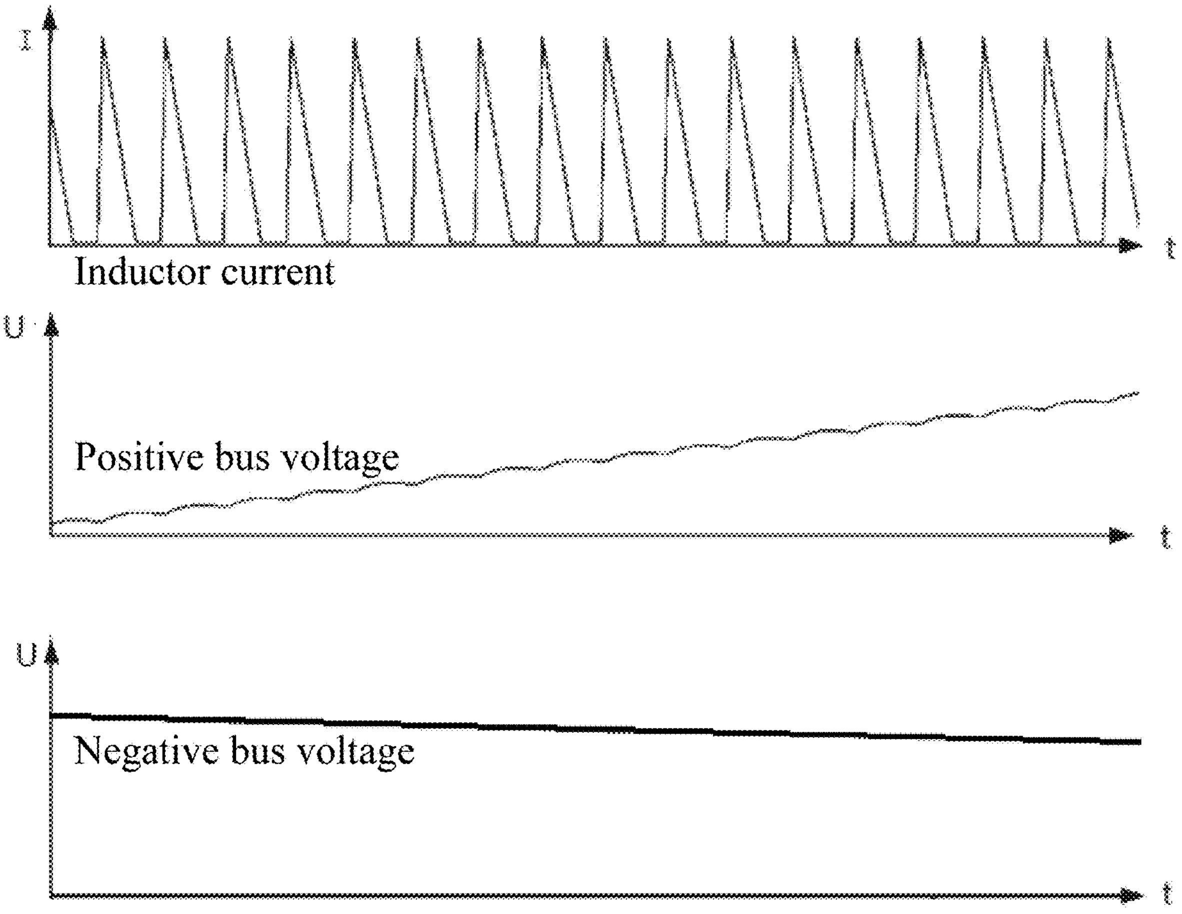
FIG. 12 is a simulation waveform diagram of a process of adjusting voltage balance between the positive direct current bus and the negative direct current bus based on the soft start simulation in FIG. 11.

FIG. 12 shows simulation waveforms during the process of adjusting voltage balance between the positive direct current bus and the negative direct current bus in soft start based on the SPS connected to the single bus shown in FIG. 11 (in FIG. 12, the horizontal axis represents time t, and the vertical axis represents current I or voltage U). As shown in FIG. 12, after it is detected that the voltage of the positive direct current bus is low, the positive direct current bus is charged separately. During the adjusting process, the voltage of the positive direct current bus keeps rising, while the voltage of the negative direct current bus decreases slightly with the level of power consumption. During this adjusting process, the conversion of inductor current remains stable, showing that this embodiment does not affect other devices such as the inductor while adjusting the voltages of the positive direct current bus and the negative direct current bus.

In some embodiments, the imbalance between the positive direct current bus and the negative direct current bus reaches a set level, that is, the voltage difference between the positive direct current bus and the negative direct current bus is greater than a set threshold. Preferably, the threshold ranges from 15 V to 20 V.

The present invention further provides an uninterruptible power supply, including the foregoing soft start control device.

Although various embodiments of the present invention are exemplified by the power converter shown in FIG. 1, those skilled in the art can apply these embodiments to other conversion circuits in soft start scenarios powered by a direct current power supply without departing from the scope of protection of the present invention.

The transistor is shown as an insulated gate bipolar transistor (IGBT) with a diode in reverse-parallel connection between a collector and an emitter in various embodiments of the present invention, which can be replaced with a metal oxide semiconductor field-effect transistor (MOSFET) with a diode in anti-parallel connection, a silicon controlled rectifier, other suitable transistors with diodes in anti-parallel connection, or other controllable electronic switches as needed.

The soft start control unit in the embodiments of the present invention is configured to control the ON and OFF of controllable switching elements (such as transistors). For example, the soft start control unit is configured to include a processing circuit for driving control on the ON/OFF of each transistor. The processing circuit may include digital electronic circuits such as an operation processing apparatus and a storage apparatus, may include analog electronic circuits such as a comparator, an operational amplifier, and a differential amplifier, or may include both digital electronic circuits and analog electronic circuits.

According to other embodiments of the present invention, the mechanical switch can be replaced with switch elements known in the art.

The above embodiments are only used for illustrating the technical solutions of the present invention, rather than limiting them. Although the present invention is described in detail with reference to the foregoing embodiments, those of ordinary skill in the art should understand that they still can make modifications to the technical solutions described in the foregoing embodiments or make equivalent replacements to some technical features therein; and these modifications or replacements do not make the essences of the corresponding technical solutions depart from the spirit and scope of the technical solutions of the embodiments of the present invention.

What is claimed is:

1. A power converter, comprising:

an input terminal, configured to be selectively connected to an alternating current power supply and a direct current power supply;

an output terminal, configured to be connected to a positive direct current bus and a negative direct current bus, wherein a positive direct current bus capacitor and a negative direct current bus capacitor connected in series with each other are electrically connected between the positive direct current bus and the negative direct current bus, and a node between the positive direct current bus capacitor and the negative direct current bus capacitor is connected to a neutral line;

a power conversion unit, connected between the input terminal and the output terminal, and configured to selectively implement AC-DC conversion or DC-DC conversion;

an inductor assembly, wherein a first terminal of the inductor assembly is connected to the input terminal;

a first node connected to a second terminal of the inductor assembly;

a second node connected to a negative electrode of the direct current power supply;

a first branch between the first node and the positive direct current bus;

a fourth branch between the neutral line and the second node;

a soft start device unit connected between the input terminal and a positive electrode of the direct current power supply, wherein the soft start device unit comprises a soft start switch and a resistor connected in series; and a soft start control unit configured to control the soft start device unit and the power conversion unit so that the direct current power supply charges each of the positive direct current bus capacitor and the negative direct current bus capacitor to the voltage of the direct current power supply, and when the voltage of the negative direct current bus capacitor is higher than a set voltage threshold of the positive direct current bus capacitor, turn on the first branch and the fourth branch, so that the inductor assembly boosts the positive direct current bus capacitor separately.

2. The power converter of claim 1, wherein the soft start control unit is configured to perform the following operations:

turning on the soft start switch, wherein the direct current power supply charges each of the positive direct current bus capacitor and the negative direct current bus capacitor to half of the voltage of the direct current power supply; and turning off the soft start switch and directly connecting the input terminal to the direct current power supply, wherein the direct current power supply charges each of the positive direct current bus capacitor and the negative direct current bus capacitor to the voltage of the direct current power supply through the power conversion unit, respectively.

3. The power converter of claim 1, wherein the power conversion unit comprises:

a second branch between the first node and the neutral line;

a third branch between the first node and the negative direct current bus;

and a fifth branch between the negative direct current bus and the second node.

4. The power converter of claim 3, wherein the soft start control unit is configured to control the soft start switch and the power conversion unit so that the direct current power supply charges each of the positive direct current bus capacitor and the negative direct current bus capacitor to the voltage of the direct current power supply through the power conversion unit using the following operations:

turning on the soft start switch, the first branch, and the fifth branch, to charge the positive direct current bus capacitor and the negative direct current bus capacitor in series to charge each of the positive direct current bus capacitor and the negative direct current bus capacitor to half of the voltage of the direct current power supply;

turning off the fifth branch and turning on the fourth branch, to charge the positive direct current bus capacitor to the voltage of the direct current power supply; and turning off the first branch and the fourth branch, and turning on the second branch and the fifth branch, to charge the negative direct current bus capacitor to the voltage of the direct current power supply.

5. The power converter of claim 4, wherein the soft start control unit is further configured to:

directly connect the input terminal to the direct current power supply;

turn on the third branch and the fifth branch so that the direct current power supply stores energy in the inductor assembly;

turn off the third branch and turn on the first branch so that the inductor assembly charges the positive direct current bus capacitor and the negative direct current bus capacitor in series.

6. The power converter of claim 5, wherein to turn off the third branch and turn on the first branch, so that the inductor assembly charges the positive direct current bus capacitor and the negative direct current bus capacitor in series, it further comprises:

when the voltage of the positive direct current bus capacitor is higher than a set voltage threshold of the negative direct current bus capacitor, turning on the second branch, so that the inductor assembly boosts the negative direct current bus capacitor separately.

7. The power converter of claim 3, wherein the first branch is controlled by a first diode to turn on unidirectionally from the first node to the positive direct current bus, a positive electrode of the first diode is connected to the first node, and a negative electrode of the first diode is connected to the positive direct current bus; and/or the second branch is controlled to turn on by a first transistor and a second transistor connected in reverse series with the first transistor, the other terminal of the first transistor is connected to the first node, and the other terminal of the second transistor is connected to the neutral line; and/or the third branch is controlled to turn on by a third transistor, a first terminal of the third transistor is connected to the first node, and a second terminal of the third transistor is connected to the negative direct current bus.

8. The power converter of claim 7, wherein the fourth branch is controlled to turn on by a fourth transistor, a first terminal of the fourth transistor is connected to the neutral line, and a second terminal of the fourth transistor is connected to the second node.

9. The power converter of claim 8, wherein the fifth branch is controlled by a second diode to turn on unidirectionally from the negative direct current bus to the negative electrode of the direct current power supply, a positive electrode of the second diode is connected to the negative direct current bus, and a negative electrode of the second diode is connected to the second node.

10. An uninterruptible power supply, comprising the power converter of claim 1.

11. A UPS comprising:

a power converter comprising:

an inductor;

a first capacitor and a second capacitor coupled in series between first and second direct current (DC) buses and coupled to one another at a neutral node; and a first switching circuit configured to selectively connect the inductor to the first and second DC buses;

a second switching circuit configured to selectively connect the inductor to a DC power source and an alternating current (AC) power source, wherein the power converter is configured to precharge the first capacitor and the second capacitor by:

(a) operating the second switching circuit to connect the DC power source to the inductor;

(b) operating the first switching circuit to conduct current from the inductor through a series combination of the first capacitor and the second capacitor to charge the first capacitor and the second capacitor to a first voltage level;

(c) operating the first switching circuit to conduct current from the inductor through the first capacitor and back to the DC power source while bypassing the second capacitor to charge the first capacitor to a second voltage level greater than the first voltage level; and (d) operating the first switching circuit to conduct current from the inductor through the second capacitor while bypassing the first capacitor to charge the second capacitor to a third voltage level greater than the first voltage level.

12. The UPS of claim 11, wherein the first switching circuit comprises:

a first branch connected between the inductor and the first DC bus;

a second branch connected between the inductor and the neutral node;

a third branch connected between the inductor and the second DC bus;

a fourth branch connected between the second DC bus and the DC power supply; and a fifth branch connected between the neutral node and the DC power supply.

13. The UPS of claim 12:

wherein in the step (b), the first branch and fifth branch conduct current while the second branch, the third branch and the fourth branch block current;

wherein the step (c), the first branch and the fourth branch conduct current while the second branch, the third branch and the fifth branch block current; and wherein in the step (d), the second branch and the fifth branch conduct current while the first branch, the third branch and the fourth branch block current.

14. The UPS of claim 12:

wherein the first branch comprises a first diode;

wherein the second branch comprises first and second transistors coupled in series;

wherein the third branch comprises a third transistor;

wherein the fourth branch comprises a second diode; and wherein the fifth branch comprises a fourth transistor.

15. The UPS of claim 11, wherein the power converter is further configured to operate in an inductor charging mode wherein current is conducted through the inductor to charge the inductor followed by a boost mode wherein energy stored in the inductor is transferred to at least one of the first capacitor and the second capacitor via the first switching circuit, and wherein the power converter is configured to selectively provide current to the first capacitor and the second capacitor during the boost phase to balance voltages across the first capacitor and the second capacitor.

16. A method of operating a UPS including an inductor, a first capacitor and a second capacitor coupled in series between first and second direct current (DC) buses and coupled to one another at a neutral node, a first switching circuit configured to selectively connect the inductor to the first and second DC buses, and a second switching circuit configured to selectively connect the inductor to a DC power source and an alternating current (AC) power source, the method comprising:

(a) operating the second switching circuit to connect the DC power source to the inductor;

(b) operating the first switching circuit to conduct current from the inductor through a series combination of the first capacitor and the second capacitor to charge the first capacitor and the second capacitor to a first voltage level;

(c) operating the first switching circuit to conduct current from the inductor through the first capacitor and back to the DC power source while bypassing the second capacitor to charge the first capacitor to a second voltage level greater than the first voltage level; and (d) operating the first switching circuit to conduct current from the inductor through the second capacitor while bypassing the first capacitor to charge the second capacitor to a third voltage level greater than the first voltage level.

17. The method of claim 16, wherein the first switching circuit comprises a first branch connected between the inductor and the first DC bus, a second branch connected between the inductor and the neutral node, a third branch connected between the inductor and the second DC bus, a fourth branch connected between the second DC bus and the DC power supply, a fifth branch connected between the neutral node and the DC power supply, and wherein the method comprises:

in the step (b), the first branch and fifth branch conduct current while the second branch, the third branch and the fourth branch block current;

in the step (c), the first branch and the fourth branch conduct current while the second branch, the third branch and the fifth branch block current; and in the step (d), the second branch and the fifth branch conduct current while the first branch, the third branch and the fourth branch block current.

18. The method of claim 16, further comprising operating the first switching circuit in an inductor charging mode wherein current is conducted through the inductor to charge the inductor followed by operating the first switching circuit in a boost mode wherein energy stored in the inductor is transferred to at least one of the first capacitor and the second capacitor via the first switching circuit, and wherein the first switching circuit selectively provides current to the first capacitor and the second capacitor during the boost phase to balance voltages across the first capacitor and the second capacitor.

* * * * *